(12) United States Patent
Gadkaree et al.

(10) Patent No.: US 6,214,204 B1
(45) Date of Patent: Apr. 10, 2001

(54) ION-REMOVAL FROM WATER USING ACTIVATED CARBON ELECTRODES

(75) Inventors: Kishor P. Gadkaree, Big Flats; Joseph F. Mach, Lindley; John L. Stempin, Beaver Dams, all of NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/384,537

(22) Filed: Aug. 27, 1999

(51) Int. Cl.[7] .................................................. C02F 1/46
(52) U.S. Cl. .................... 205/758; 204/267; 204/272; 204/551; 204/647; 204/671; 204/290.01; 204/290.12; 204/290.15
(58) Field of Search .................................. 205/742, 758; 204/267, 272, 551, 647, 671, 290.01, 290.12, 290.15

(56) References Cited

U.S. PATENT DOCUMENTS

| | | | |
|---|---|---|---|
| 5,415,768 | * | 5/1995 | Andelman ........................ 210/198.2 |
| 5,425,858 | | 6/1995 | Farmer . |
| 5,451,444 | | 9/1995 | DeLiso et al. . |
| 5,620,597 | | 4/1997 | Andelman . |
| 5,820,967 | | 10/1998 | Gadkaree . |

* cited by examiner

*Primary Examiner*—Arun S. Phasge
(74) *Attorney, Agent, or Firm*—L. Rita Herzfeld; Anca C. Gheorghiu

(57) ABSTRACT

An electrode for deionization of water is made of a continuous activated carbon structure. The activated carbon is derived from a synthetic carbon precursor. The structure has openings, inlet and outlet ends such that water entering the inlet end passes through the openings and exits through the outlet end, a conductive coating on at least part of the outer surface of the structure, and a metal wire in contact with the structure. A deionization system is made up of the electrodes in series so that the outlet end of one electrode is next to the inlet end of the nearest downstream electrode. The metal wire of each electrode is connected to a power source to deliver the opposite charge as the charge delivered to its neighboring electrodes. Each of the electrodes is fixedly attached to and sealed within a housing with an air and moisture-tight seal. Openings in the housing between the electrodes, allow air to be removed before use. A method of removing ions from a stream of water involves removing air from the system by applying a vacuum to the housing openings and sealing the housing openings, passing a current through the device, and passing a stream of water containing ions through it to remove the ions.

22 Claims, 16 Drawing Sheets

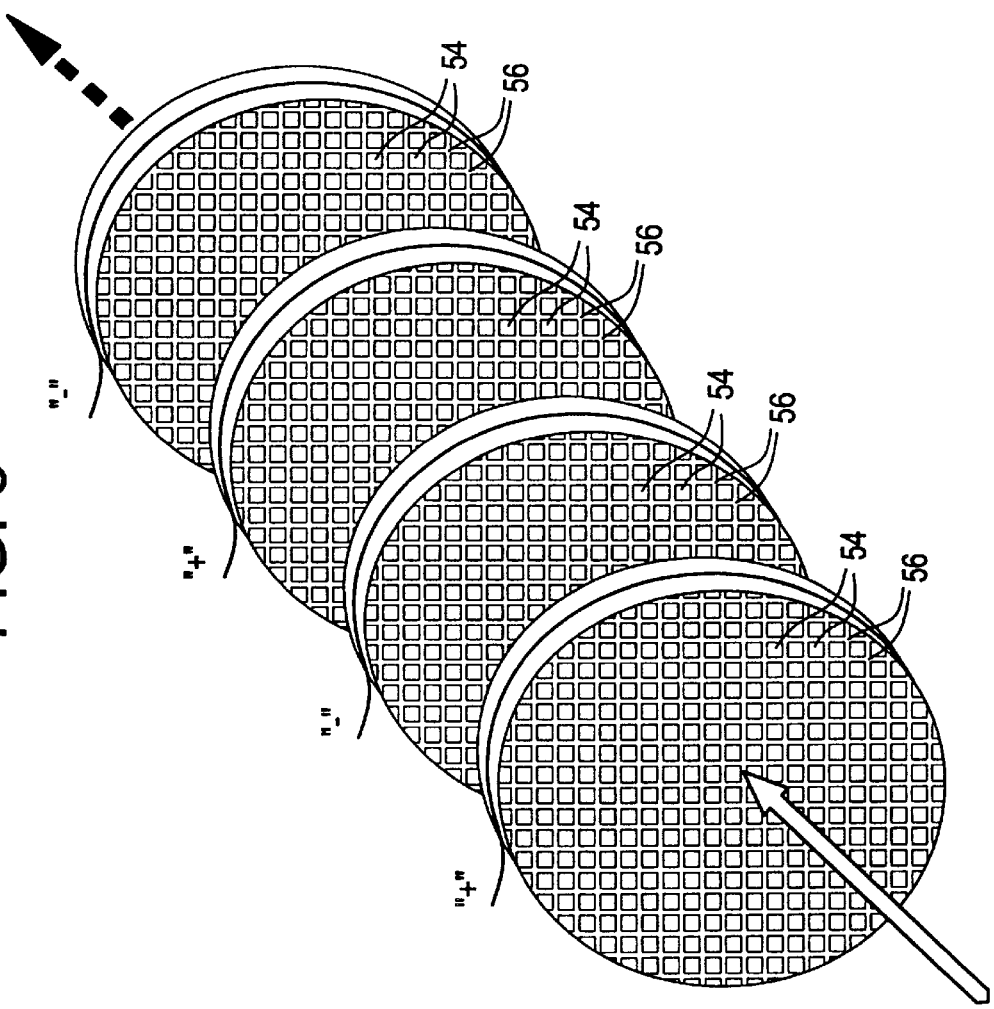

ION-REMOVAL FROM WATER USING ACTIVATED CARBON ELECTRODES

This invention relates to use of activated carbon electrodes for removal of ions from water utilizing electrodes made of activated carbon derived from carbon precursors. The electrodes are preferably honeycombs.

BACKGROUND OF THE INVENTION

Deionized water is needed for many industrial applications, as desalination, industrial waste purification, and electronics industry processes. Typically, deionization is carried out using ion exchange resins followed by reverse osmosis. The ion exchange resins are expensive and may cause problems such as growth of bacteria on the resins, and introduction of sodium ions in the water if cation exchange resins are used, which may be undesirable. Anion exchange resins can become corrosive to plumbing and fixtures, and may result in elevated levels of copper, iron, or lead in the water in addition to shortening the life of the fixtures. Reverse osmosis processes are energy-intensive, requiring high water pressures to move water through clogged membranes. Distillation is a way to obtain water without some of these problems but it is very energy and labor intensive and impractical in most cases.

Deionization of water has been carried out electrolytically utilizing carbon electrodes made of particulate carbon bonded with a binder. The disadvantage of this method is that such electrodes are not durable. The binder degrades resulting in disintegration of the electrode. The presence of binder also reduces the conductivity of the electrode.

More recently, U.S. Pat. No. 5,425,858 discloses a method of removing ions from water by electrolysis using a relatively large number of electrodes made of carbon bonded to a support plate made of titanium, which is expensive. The carbon is made by mixing resin with a fiber mat and then carbonizing. It is bound to the titanium plate with a polymer binder. Because the carbon is present as a supported material, the effective amount of carbon, which is in essence, the functioning electrode, is not large. Therefore a large number of electrodes must be used to accomplish any significant amount of deionization. Another disadvantage of this method is that the distance between electrodes must be maintained at a critical distance of about 0.5 mm for deionization to take place efficiently. To achieve this distance, the plates must be engineered to be perfectly flat, which is expensive, and plumbing is critical. The water follows a serpentine path between the electrodes, which requires complex plumbing, and throughput suffers as a result of the long flow path.

U.S. Pat. Nos. 5,415,768 and 5,620,597 relate to deionization systems fabricated from activated carbon fibers. The use of activated carbon fibers is not very advantageous from economic as well as performance point of view. The activated carbon fibers are derived from carbon fibers which are expensive due to the inherently expensive manufacturing process. These fibers are then subjected to further activation process at high temperature which increases the cost of the fibers even more. A device containing these fibers becomes prohibitively expensive. From the performance point of view also the fiber geometry is not desirable. The commercial carbon and activated carbon fibers have a very fine diameter (ten microns). On activation (which causes pore formation in fibers) the fibers become very weak and can easily break during normal handling. As a result of this weakness, a fiber strand (containing several fiber) contains multiple broken ends along its length. These broken ends create discontinuities, causing problems in uniform current flow. The fibers have to be packaged in a strand containing several hundred fibers because of the low strength. This prevents access of liquid to the interior fibers in the strand due to surface tension forces and so majority of the fibers do not participate in the process. The fibers strands do not have good conductivity because of the broken ends as well as presence of a large number of individual fibers in the strand, as opposed to a monolithic structure. This results in loss of power and hence inefficient operation of the device. Use of a conductive support is necessary for the fibers because of their flexibility. The support has to be fabricated out of a very expensive metal such as titanium or a relatively inexpensive material such as graphite foil. The graphite foil material is a graphite material which is conductive and flexible, however, because of the need to make it flexible, it has to be very thin and as a result is very fragile. It is extremely difficult to attach any electrical connections to it and make a robust device for practical applications, which would survive any stresses such as would be applied by flowing water for any length of time.

Use of pressed activated carbon washers containing binders becomes a problem from the point of view of conductivity due to nonconductive binders, as well as preferred conduction path due to random particle to particle contact. Long term durability of these forms is questionable.

Consequently there still exists a need in various applications for cost effective, efficient, and simpler methods for removal of ions from water.

The present invention provides such an ion removal system.

SUMMARY OF THE INVENTION

In accordance with one aspect of the invention, there is provided an electrode for deionization of water that is made of a continuous activated carbon structure. The activated carbon is derived from a synthetic carbon precursor. The structure has openings, inlet and outlet ends such that water entering the inlet end passes through the openings and exits through the outlet end, a conductive coating on at least part of the outer surface of the structure, and a metal wire in contact with the structure.

In accordance with another aspect of the invention, there is provided a deionization system that is made up of the electrodes in series so that the outlet end of one electrode is next to the inlet end of the nearest downstream electrode. The metal wire of each electrode is connected to a power source to deliver the opposite charge as the charge delivered to its neighboring electrodes. Each of the electrodes is fixedly attached to and sealed within a housing with an air and moisture-tight seal. Openings in the housing between the electrodes, allow air to be removed before use.

In accordance with another aspect of the invention, there is provided a method of removing ions from a stream of water utilizing the above-described system and electrodes. The method involves removing air from the system by applying a vacuum to the housing openings and sealing the housing openings, passing a current through the device, and passing a stream of water containing ions through it to remove the ions.

BRIEF DESCRIPTION OF THE DRAWINGS

FIG. 5 is a schematic diagram showing the placement of the flow-through electrodes of the present invention in a water deionization system.

DETAILED DESCRIPTION OF THE INVENTION

Figure 1:
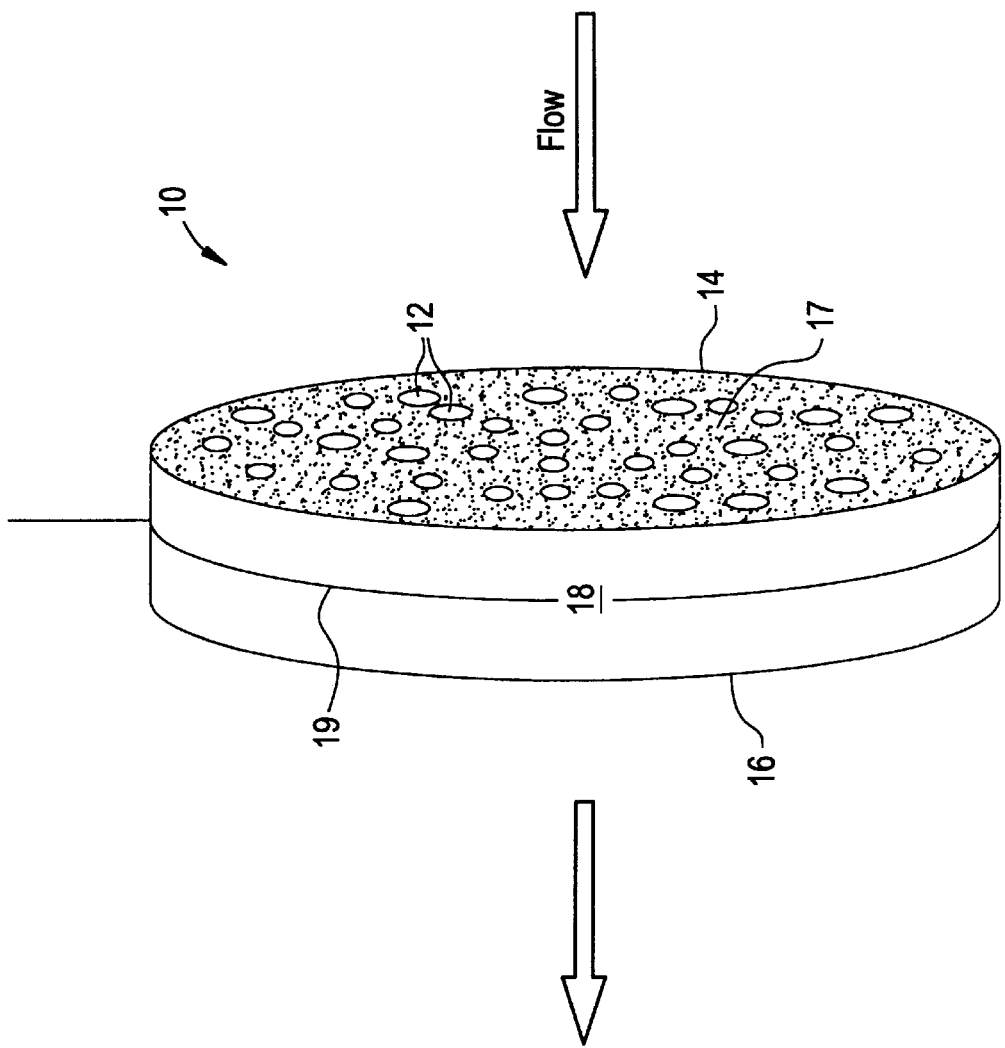
FIGS. 1–4, and 4A are schematic diagrams of electrodes of the present invention having various configurations of openings.

This invention relates to an activated carbon electrode and a system for utilizing the electrodes in series to remove ions from water.

The electrode is made of continuous activated carbon derived from a carbon precursor. By carbon precursor is meant a carbon-containing synthetic substance that converts to continuous structure carbon on heating. The carbon precursor can include any synthetic liquid or liquefiable carbonaceous substance. Examples of useful carbon precursors include crosslinkable resins such as thermosetting resins, thermoplastic resins (e.g., polyvinylidene, polyvinyl chloride, polyvinyl alcohol, and the like), furfuryl alcohol.

Low viscosity carbon precursors (e.g., thermoset resins) are preferred. Phenolic resins are most preferred due to their low viscosity, high carbon yield, high degree of crosslinking upon curing relative to other precursors, and low cost. Phenolic resins that are especially suited are phenolic resoles such as plyophen (No. 43290), supplied by Occidental Chemical Co., Niagara Falls, N.Y.

The carbon precursor used in the present method can include a single precursor material or a mixture of two or more precursor materials.

In general, activated carbon bodies derived from carbon precursors have distinct advantages over bodies made by shaping discrete activated carbon particles. Bodies made directly from activated carbon are made of discontinuous carbon which must be bound together by permanent binders. In many cases, bodies made from activated carbon particles are not durable in water, because the binder holding the structure together is water soluble. Carbon particles generally do not form a good bond with any binder and so durability of any structure containing carbon powder and binders is a major issue. The fluid attacks the interface between the binder and carbon destroying the already weak bond, causing the structure to disintegrate. Other issues associated with such a structure include preferred conducting paths through the structure (due to particle-to-particle contact), poor conductivity of the overall structure (because of non-conducting binders), entrainment of particles in the water as the structure slowly disintegrates, and requirement for a filtering medium to remove these particles. Precursor-derived activated carbon bodies on the other hand are made of continuous carbon and do not require permanent binders. This continuous carbon structure is strong and durable and can be used in high flow rate chemical processes. Such bodies also have durability in liquid streams. These features of precursor-derived activated carbon contribute to improved conductivity over that of discrete activated carbon particles.

The activated carbon electrode can be in any form that is practical. Preferably the activated carbon is a body shaped from activated carbon because of the high amount of carbon; although it can also be in the form of an activated carbon coating on a non-conductive substrate.

In the former embodiment, a mixture of carbon precursor, binders and/or fillers, and forming aids, is shaped such as by extrusion, compression molding, injection molding, etc. into various shaped structures having a structure with through openings as described above.

Some binders that can be used especially for extrusion are plasticizing temporary organic binders such as cellulose ethers. Some typical cellulose ethers are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred.

Some fillers that are suited include both natural and synthetic, hydrophobic, and hydrophilic, fibrous and non-fibrous, carbonizable and non-carbonizable fillers.

For example some natural fillers are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat flour, wool fibers, corn, potato, rice, tapioca, coal powder, activated carbon powder, etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

Some inorganic fillers that can be used are oxygen-containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers.

Organic fillers provide additional support to the shaped structure and introduce wall porosity on carbonization because in general they leave very little carbon residue. Some organic fillers are polyacrylonitrile fibers, polyester fibers (flock), nylon fibers, polypropylene fibers (flock) or powder, acrylic fibers or powder, aramid fibers, polyvinyl alcohol, etc.

Addition of phosphoric acid to the carbon precursor has been found to enhance the conductivity of the activated carbon structure produced. Phosphoric acid is added to the carbon precursor at about 0.1% to 10% by weight before adding the other fillers.

Some binders and fillers that are especially suited are described in U.S. Pat. No. 5,820,967, and U.S. application Ser. No. 09/231,859, which are herein incorporated by reference.

Some forming e.g. extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder.

Generally honeycomb cell densities can range from as high as about 775 cells/cm$^2$ (5000 cells/in$^2$) to 1 cell/cm$^2$ (about 6 cells/in$^2$). Some examples of commonly used honeycombs in addition to these, although it is to be understood that the invention is not limited to such, are about 235 cells/cm$^2$ (1500 cells/in$^2$), about 94 cells/cm$^2$ (600 cells/in$^2$), about 62 cells/cm$^2$ (400 cells/in$^2$), or about 47 cells/cm$^2$ (300 cells/in$^2$), and those having about 31 cells/cm$^2$ (200 cells/in$^2$). Typical wall thicknesses are for example, about 0.15 mm for about 62 cells/cm$^2$ (about 400 cells/in$^2$) honeycombs. Wall (web) thicknesses range typically from about 0.1 to about 1.5 mm.

In addition to their high carbon content, shaped honeycombs are very durable and can be about 1 to 100% activated carbon, and have a continuous highly conductive carbon structure. The honeycombs can be formed to give various wall thicknesses and cell densities. The short distance needed for ionic removal is obtained by controlling the cell density of the honeycomb. For example, a honeycomb of about 600 cells/in$^2$ has a distance between cell walls of about 1 mm. By controlling the cell wall thickness, cell density, and carbon material properties, high ion removal efficiences can be achieved.

In the latter embodiment, the substrate must have enough strength to function in the application and be capable of withstanding the heat-treating temperature experienced in forming the activated carbon coating. The substrate is a structure with through openings, through which water can pass. It is preferably a multicellular structure such as a honeycomb as described above, or a structure with openings such as slits for passage of water through it.

It is desirable that the overall open porosity of the substrate be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

Suitable porous substrate materials include ceramic, glass ceramic, glass, clays, and combinations thereof. By combinations is meant physical or chemical combinations, e.g., mixtures, compounds, or composites.

Some materials that are especially suited to the practice of the present invention, although it is to be understood that the invention is not limited to such, are those made of cordierite, mullite, clay, magnesia, and metal oxides, talc, zircon, zirconia, zirconates, zirconia-spinel, magnesium aluminosilicates, spinel, alumina, silica, silicates, borides, aluminosilicates, eg., porcelains, lithium aluminosilicates, alumina silica, feldspar, titania, fused silica, nitrides, borides, carbides, eg., silicon carbide, silicon nitride or mixtures of these. Cordierite is preferred because its coefficient of thermal expansion is comparable to that of carbon, increasing the stability of the activated carbon body.

One preferred method of obtaining an activated carbon coated substrate is described in U.S. Pat. No. 5,451,444, which is herein incorporated by reference.

When the carbon precursor is a thermosetting resin, the carbon precursor is cured prior to activation and most typically prior to carbonization. The curing is accomplished typically by heating the precursor to temperatures of about 100° C. to about 200° C. for about 0.5 to about 5.0 hours. Curing is generally performed in air at atmospheric pressures. When using certain precursors, (e.g., furfuryl alcohol) curing can be accomplished by adding a curing catalyst such as an acid catalyst at room temperature.

Carbonization is the thermal decomposition of the carbonaceous material, thereby eliminating low molecular weight species (e.g., carbon dioxide, water, gaseous hydrocarbons, etc.) and producing a fixed carbon mass and a rudimentary pore structure in the carbon.

Such conversion or carbonization of the cured carbon precursor is accomplished typically by heating to a temperature in the range of about 600° C. to about 1000° C. for about 1 to about 10 hours in a reducing or inert atmosphere (e.g., nitrogen, argon, helium, etc.).

Curing and carbonizing the carbon precursor results in substantially uninterrupted carbon. Where the carbon is in the form of a coating, the carbon coating is anchored into the porosity of the substrate and as a result is highly adherent. The top surface of the carbon coating is an uninterrupted layer of carbon to carbon bonds. If interconnecting porosity is present in the substrate, an interlocking network of carbon will be formed within the composition, resulting in an even more adherent carbon coating. The coating of uninterrupted carbon extending over the outer surface of the substrate formed provides a structure with advantages of high capability despite a relatively low carbon content, high strength, and high use temperatures.

The activating is done to substantially enhance the volume and to enlarge the diameter of the micropores formed during carbonization, as well as to create new porosity. Activation creates a high surface area and in turn imparts high capacity to the structure. Activation is done by known methods such as exposing the structure to an oxidizing agent such as steam, carbon dioxide, metal chloride (e.g., zinc chloride), phosphoric acid, or potassium sulfide, at high temperatures (e.g., about 600° C. to about 1000° C.).

Activated carbon bodies or coatings derived from carbon precursors have distinct advantages over bodies and coatings made from activated carbon particles. Bodies made directly from activated carbon are made of discontinuous carbon which must be bound together by permanent binders; whereas activated carbon bodies e.g. honeycombs derived from synthetic carbon precursors are made of continuous carbon and do not require permanent binders. This continuous carbon structure is strong and durable and can be used in high flow rate processes. Such bodies also have durability in liquid streams. Bodies made from activated carbon particles are not durable in water in many cases, since the binder holding the structure together is water soluble. Coatings made of activated carbon particles are not as uniform or adherent as those derived from carbon precursors, and are more subject to erosion.

Additionally, the electrodes of the present invention have the advantages of electrical conductivity coupled with inertness, durability, as well as high surface area, e.g. >1000 $m^2/g$, the latter in contrast to the low surface area of non-activated carbon e.g. graphite. Optimum surface area is limited by charge density, therefore it is desirable that the surface area not be greater than about 1600 $m^2/g$, and be preferably between about 100 to 1600 $m^2/g$.

One advantageous composition given in wt. %, for example is about 55.6% (±2%) phenolic resin, about 22.2% (±1%) cellulose fiber, about 14.7% (±1%) cordierite powder, about 4.6% (±0.5%) methylcellulose, 0.9% (±0.1%) sodium stearate, and 2% (±0.2%) phosphoric acid. Carbonization and activation at about 900° C. yield an activated carbon structure with a surface area of about 1000 $m^2/g$.

The electrodes can have any cross section such as for example, circular, elliptical, square, rectangular, etc.

While there is no limitation on the size of the electrodes, they are generally no greater than about 2.54 cm in length (or thickness), and preferably 1–25 mm, more preferably less than about 10 mm, and most preferably about 5 mm.

The electrode is a structure that allows the water to actually flow through it. Throughput and ion removal efficiency are greater in this electrode than in electrodes that are commonly in use today in which flow occurs around the electrode.

The openings through which the water passes can take any form such as relatively large pores dispersed throughout the structure, which are at least about 0.5 micrometers in average diameter, or through channels which can take any shape, such as slits, or the openings can be a multitude of cells having porous walls, such as in a honeycomb structure. Also a portion of the cells of a honeycomb structure can be plugged at the inlet end and the remaining portion of cells can be plugged at the outlet end so that water entering the structure through the open cells at the inlet end passes through the porous walls and out of the structure through the open cells at the outlet end. This latter arrangement allows for increased efficiency and capacity.

A thin conductive coating is in contact with at least part of the outer surface of the electrode to minimize the internal resistance of the electrode. While it can be anywhere on the outer surface, it is preferably on either the inlet end face and/or outlet end face. The coating can be of any metal that is resistant to corrosion. A preferred conductive coating metal is titanium. The coating is relatively thin. Generally the coating thickness is no greater than about 2% of the length (or thickness) of the electrode, preferably no greater than about 0.1%, and most preferably no greater than about 0.04%, these values being based typically, but not exclusively on an electrode thickness of about 5 millimeters. Generally, the conductive coating thickness does not exceed about 10 micrometers. The purpose of the conductive coating is to enhance the conductivity through the electrode.

An electrical connection to the electrode is established from a power source by means of a metal wire. It is most typically wrapped around the thickness of the electrode; or it can be mechanically fastened to the electrode through openings in the electrode. The wire must be attached to the electrode in such a way as to minimize contact resistance. While any metal wire fabricated from highly electrochemical corrosion-resistant metal is acceptable, titanium wire is preferred.

The electrode is best described by referring to the drawings. FIGS. 1–4 are schematics showing electrodes, which are more typically activated carbon bodies, with various types of openings through which the water flows. The arrows indicate the flow of the water through the electrode. FIG. 1 shows an electrode (10) having pores (12) and an outer surface or thickness (18). Water passes through the pores into inlet end face (14) and out through outlet end face (16) following a flow path equal to the thickness of the electrode. FIG. 1 illustrates a conductive coating (17) on the inlet end face, and metal wire (19) wound around the outer surface or thickness.

Figure 2:
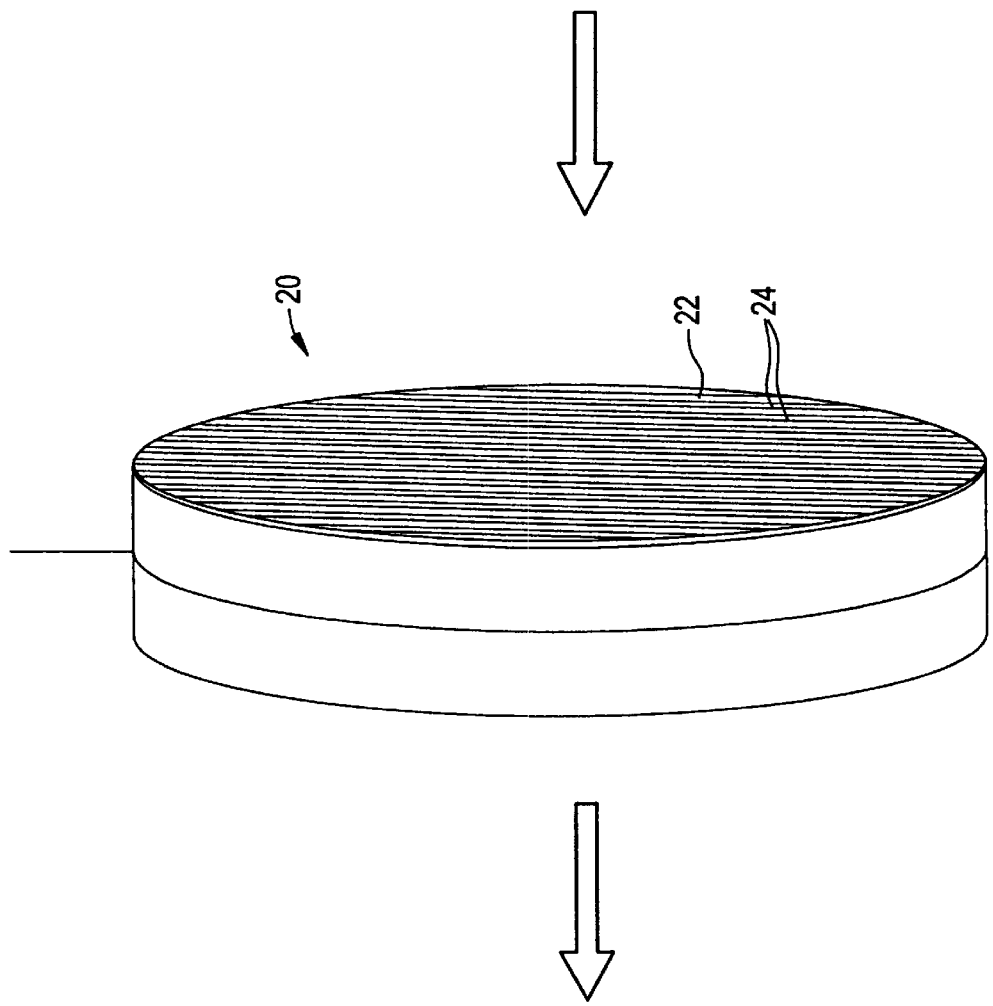

FIG. 2 shows an electrode (20) having as openings as slits (22) through which the water passes. The slits are separated from one another by walls (24) having a thickness.

Figure 3:
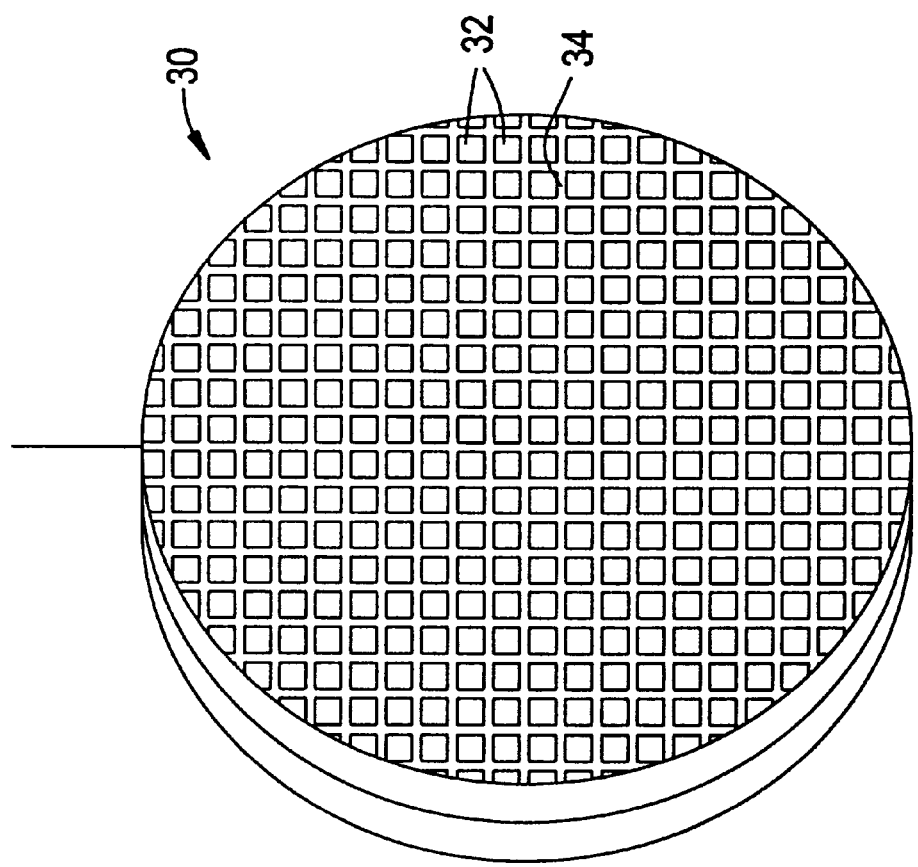

FIG. 3 shows an electrode (30) that is a multicellular structure or honeycomb. Water passes through the honeycomb cells (32) having a wall thickness (34).

Figure 4:
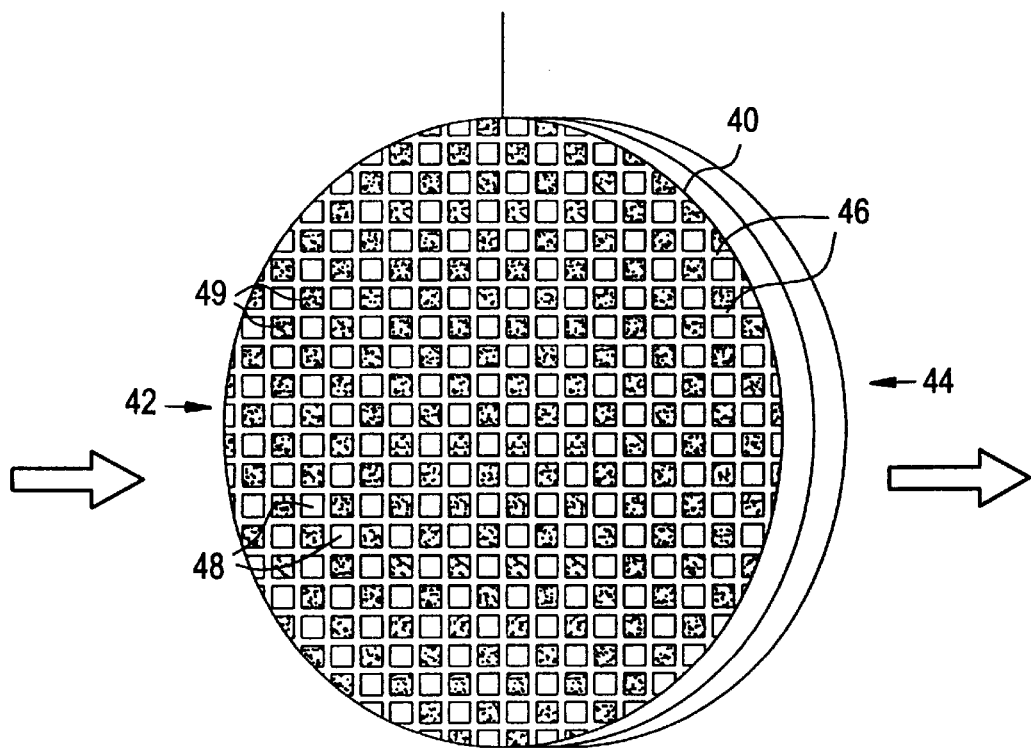
Figure 4A:
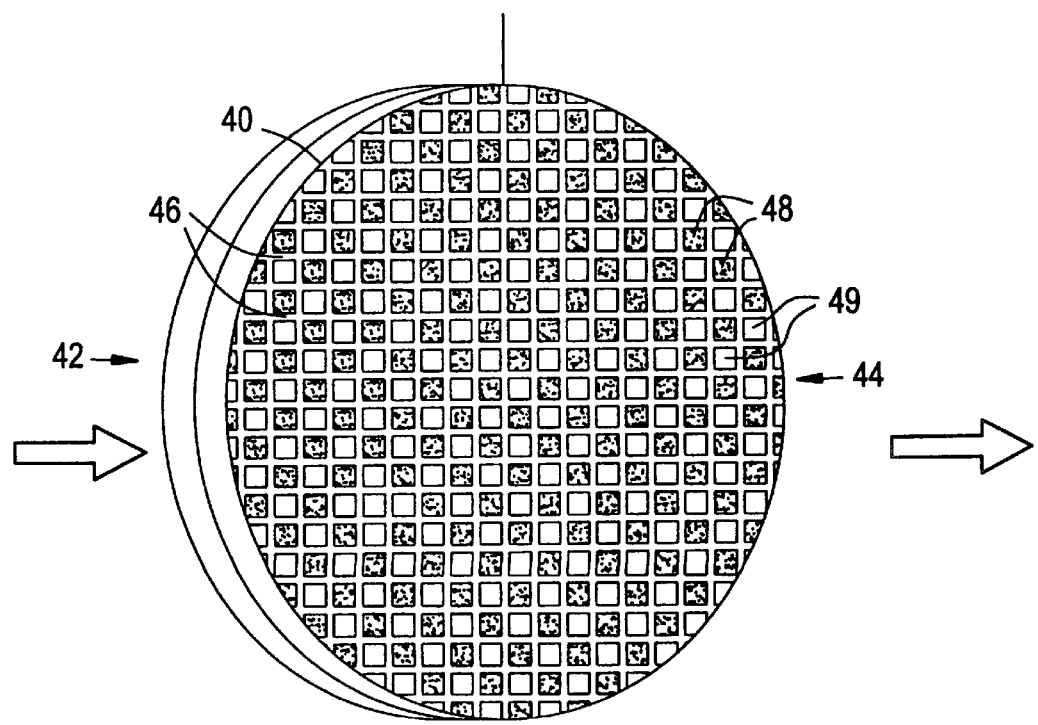

FIG. 4 is an electrode (40) having a multicellular structure similar to that of FIG. 3, but a portion of the cells (49) are plugged at the inlet end face (42) and unplugged or open at the outlet end face (44); and the remaining portion of cells, (48), are open at the inlet end face (42) and plugged at the outlet end face (44). Water flows into open cells (48) at the inlet end face, and then through the porous cell walls (46) and finally out of the electrode through the open cells (49) at the outlet end face.

As shown in FIG. 5 the electrodes are arranged differently than is traditionally done. The water flow is perpendicular to the electrodes. Any of the electrodes in FIGS. 1–4 can be used. For illustrative purposes, high cell density honeycombs (52) are (shown here similar to those of FIG. 3). Water flows through the honeycomb cells, (54) through cell walls (56), as indicated by the arrows, instead of between the electrodes as traditionally done. Such a flow pattern allows very simple construction of the deionization device. Each honeycomb electrode is shown having an electrical charge opposite that of its immediate neighbor. The electrodes can be enclosed in a housing such as a tube, or other housing which may be circular, square, elliptical, etc. made of polymer material such as polypropylene (not shown here), and water is allowed to flow through for deionization. In the case of honeycombs, by controlling the cell density and wall thickness, the effective flow area can be controlled to obtain very efficient contact between the ions in water and the electrode. In traditional designs, the distance between the electrodes is minimized to obtain this efficiency of contact. Because cell density and cell wall thickness control the contact efficiency in the device or system of this invention, the system is relatively insensitive to distance between the electrodes. Another advantage of the system of this invention is that because honeycombs have high surface area to volume ratio as compared to flat plates in the traditional art, the ion removal efficiency is higher than in a flat plate electrode with a similar amount of active material. The ion-removal capacity is proportional to the amount of carbon per unit volume in the electrode.

In a system utilizing electrodes depicted in FIG. 4, the alternately plugged design, the ion removal efficiency is greater because this arrangement causes water to flow through the porous walls of the honeycomb allowing much more intimate contact between the ions and electrodes and full utilization of the carbon in the electrode structures.

The electrodes are set in a housing. The housing must be of appropriate diameter with openings for the metal wires to pass to connect the respective electrode to a power supply, as well as openings to remove trapped air. The electrodes are sealed in the housing such that there is no flow of water around its edges. Recessed grooves in the outer shell of the housing are one way to accomplish this objective. Rubber or plastic washers can be incorporated to prevent flow around the electrodes. The housing should have enough structural integrity to provide support to the electrodes and be electrically non-conductive.

Figure 6:
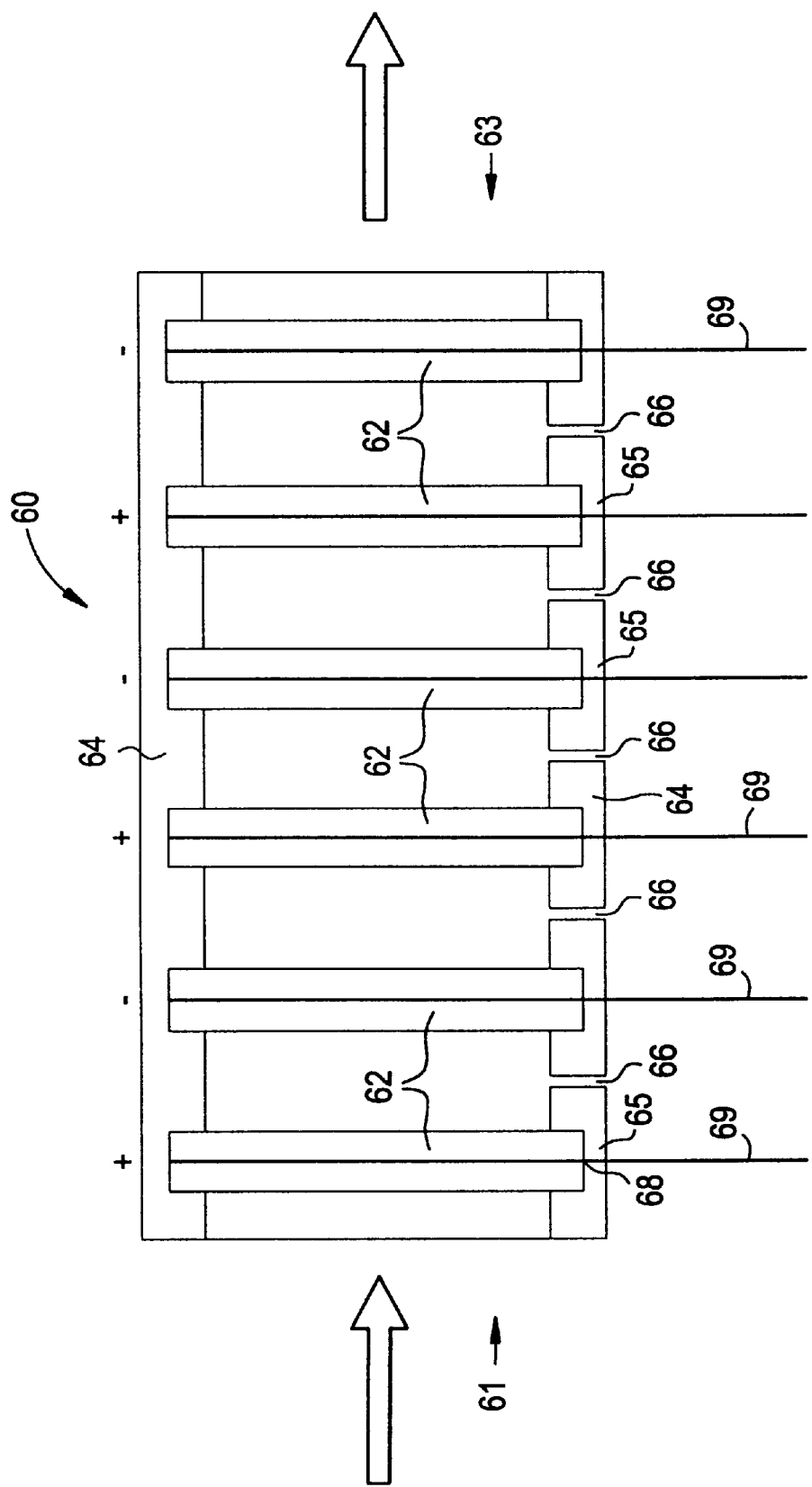
FIG. 6 is a schematic diagram of the deionization system of the present invention.

FIG. 6 shows a system (60) having a plurality of electrodes (62) as described in the FIGS. 1–4. Housing (64) has recessed grooves (65) where each electrode is held in place. The recessed grooves have a small openings (68) for the electrode wires (69) to fit through to be attached to a power source (not shown). The housing has a plurality of openings (66) or bleed holes disposed on it through which air is removed, such as by applying a vacuum with a vacuum pump, (not shown), before water is passed through it. Each electrode is supplied with current, either AC or DC from a power source, (not shown) such that each has a charge opposite that of its neighbors. Although this arrangement is considered most efficient, i.e. one positive next to one negative electrode, arrangements of more than one consecutive positive electrodes next to more than one consecutive negative electrodes, such as e.g. two positives next to two negatives, are considered workable. Water is passed through the electrodes by means of a pump. Water flow through the system is indicated by the arrows from inlet end, (61), to outlet end, (63). During passage in and out of each successive electrode, ions are attracted to the electrodes having the opposite charge. Ion-free water exits the system through the outlet end.

It was demonstrated that ions can be removed effectively from water using the system and activated carbon electrodes of the present invention. The electrodes were found to be inert to the action of any chemical in the water and acted merely as conductors of electrical current. The activated carbon electrodes were found to have low resistance compared to unactivated carbon and so they function well as electrodes. Another advantage activated carbon electrodes is that they have a surface area orders of magnitude higher compared to unactivated carbon. This is very beneficial in electrolysis.

Other advantages are that this type of system in which flow through bodies are utilized, avoids plumbing problems that are present in systems where water flows around the electrodes. Conductivity measurements confirm that there is no need for metallic support structures. Also in the flow-through design, the distance between the electrodes is not critical, making fabrication easier.

Still other advantages of the system of the present invention over prior ion removal systems are high geometric surface area/volume ratio (10–20 times higher) than in system where water flows around the electrodes, resulting in higher efficiency and low pressure drop. Expensive titanium plates are not needed. The plumbing is simple. There is more carbon per unit volume, (e.g. generally 0.5 $ft^3/ft^3$ of material in the system as opposed to 0.002 for prior systems), as well as better utilization of carbon resulting in higher capacity. There is lower energy loss because of fewer contact interfaces and drops across these interfaces, than with systems utilizing a large number of electrodes. The fabrication process is simple and efficient. The system of the present invention is suitable for use in any application in which ions are removed from water and is not limited to any particular use or any particular ions. Some uses are for water softening, ultra-pure water for the electronics industry, desalination, waste water purification, industrial uses, etc. for removal of ions such as of sodium, calcium, magnesium, nickel, cadmium, chromium, ammonium, chloride, nitrate, and/or sulfate, etc.

After use, the electrodes can be disconnected from the power source at which time the electrical force holding the ions to the electrode is removed and the ions attached to the electrode can simply be removed by washing with water.

In accordance with still another embodiment, in practice, the deionization device can be used in conjunction with a particulate filtration system to avoid clogging of the device. A particulate filtration device can be any of the well known devices that are available. Some examples of these are those devices based on polymer membranes, or ceramic membranes for microfiltration or ultrafiltration.

More than one deionization system can be used in parallel. While one system is operating, the other system(s) is being regenerated. In the case where two systems are used in parallel, the charge accumulated on the device to be regenerated can be used as a power source for the second system.

To more fully illustrate the invention, the following non-limiting examples are presented. All parts, portions, and percentages are on a weight basis unless otherwise stated.

EXAMPLE 1

A carbon honeycomb of 600 cells/$in^2$ was fabricated by extruding a mixture of 55.6% phenolic resin, 22.2% cellulose fiber, 14.7% cordierite powder, methylcellulose, 0.9% sodium stearate, and 2% phosphoric acid. The honeycomb was then cured at about 150° C. and carbonized and activated at about 900° C. in nitrogen and carbon dioxide respectively. The honeycomb was then cut to 55×20×4.8 mm size. Copper wire was attached to the honeycomb mechanically by introducing the wire through one cell of the honeycomb and then soldering the end to the honeycomb. The honeycomb was joined to another like honeycomb by means of a polypropylene monofilament about 1 mm thick. The monofilament was wound around the adjoining ends of the honeycombs to join them together but still allow separation of the two electrodes. This assembly was introduced in water containing about 900 ppm of sodium chloride. A potential difference of about 1.2 volts was then applied across the electrodes. The solution was circulated through the electrodes via a peristaltic pump and removal of the salt from the solution was monitored. It was found that the salt concentration dropped from 9000 ppm to 8200 ppm for a solution volume of about 400 ml. Electrodes were regenerated by disconnecting the power supply and simply washing the electrodes with distilled water. After regeneration, the electrode performance returned to 100% of its original performance. The current was 0.14 milliamps at the start, declining to 0.05 milliamps at the end of about 20 minutes. The amount of salt removal with only one pair of small electrodes at very low current level is significant. This demonstrates that flow through honeycomb electrodes works and a simple deionization system is feasible.

EXAMPLE 2

Activated carbon honeycombs were fabricated by mixing and mulling phenolic resin with various fillers, such as cellulose fiber, ceramic particulate filler, phosphoric acid, and methylcellulose as given in Example 1. The mixture is extruded through a 400 cell/in$^2$ die, dried at about 80–90° C., and cured at about 150° C. in circulating air. The cured honeycombs were then carbonized in nitrogen at about 900° C. and activated in carbon dioxide to obtain activated carbon of varying surface area. The surface area of the was controlled by controlling the time at activation temperature from 1–12 hours. With longer time at temperature resulting in the higher surface areas. During the carbonization process, the honeycomb shrinks to an increased cell density of about 600 cells/in$^2$. The honeycombs were then cut the appropriate thickness to fabricate the electrodes.

Two electrodes were placed in a plastic container as a housing, with dimensions of 50 mm long 50 mm wide×20 mm high. The electrodes were 50 mm×20 mm×5 mm thick. During the deionization test, the electrodes were submerged in the solutions to a depth of about 40 mm. Connecting copper wires were attached to the electrodes via soldering. The precaution of maintaining significant distance between the water level and the solder contact prevented metal corrosion problems. The salt solution was circulated through the electrodes through the honeycomb cells via a peristaltic pump. A DC power source was used to deliver 1.2 volts potential. Salt concentrations were measured as a function of time for various electrodes as well as for various salt solutions as described below.

Figure 7:
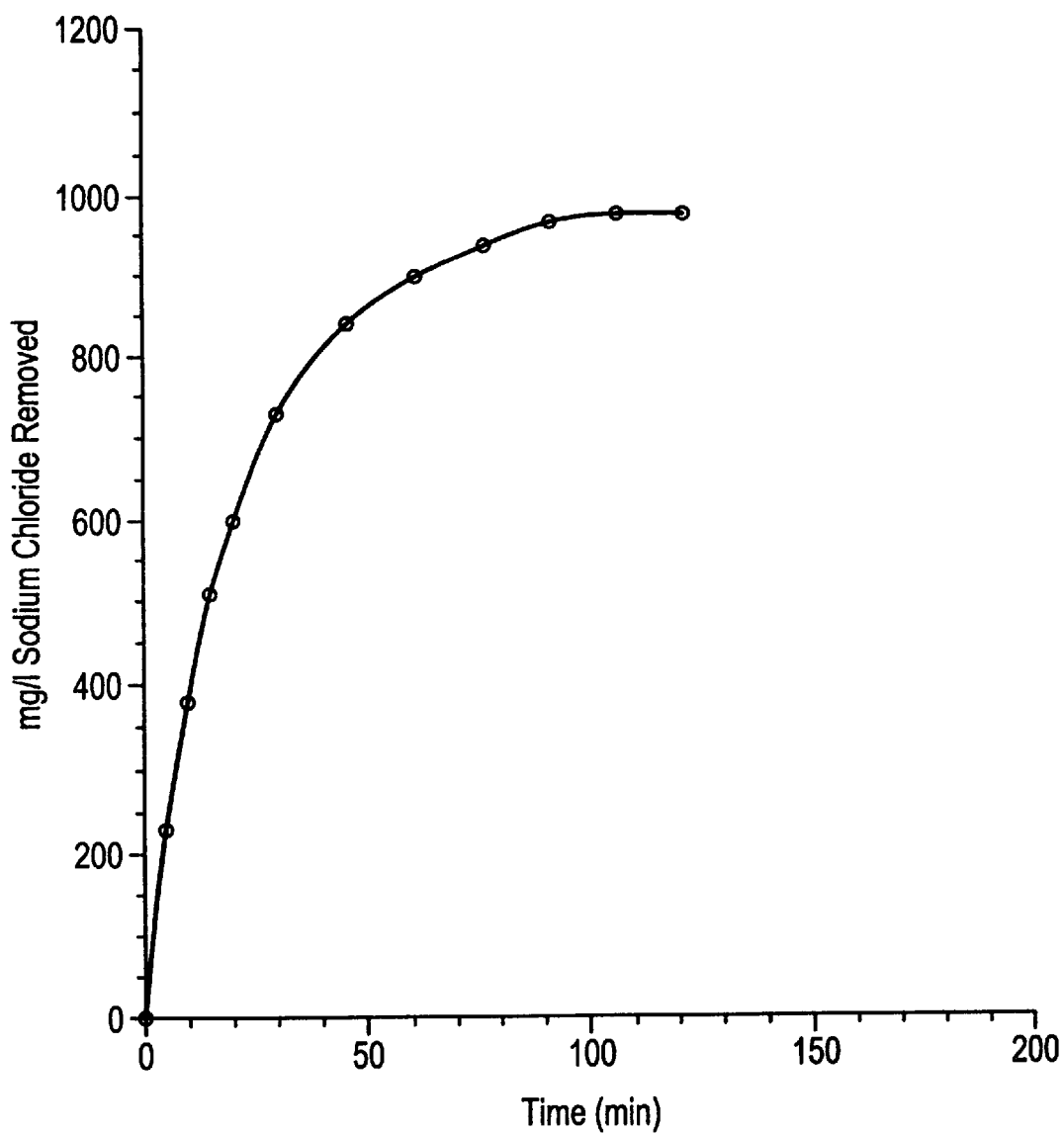
FIG. 7 is a plot of removal of sodium chloride versus time according to the present invention.

Sodium chloride solutions were made by dissolving the appropriate amount of salt in distilled water. The activated carbon electrodes had a very high surface area and pore volume and contained a large amount of adsorbed air that had to be removed. The air was removed by dipping the electrodes in distilled water in an ultrasonic bath. The ultrasonic vibrations dislodged most of the air. The electrodes containing distilled water were then dipped in the cell-filled salt solution. The solution was circulated through the electrodes for about 30 minutes to stabilize concentration readings. A potential was then applied and concentrations were measured as a function of time. FIG. 7 shows deionization data. The initial slope of the curve gives the removal rate, and the maximum amount adsorbed can be used to calculate the total adsorption capacity of the electrodes. The removal rate is about 30 mg/l,min and the total capacity is about 990 mg/l. The solution had a starting concentration of about 10,000 ppm sodium chloride.

EXAMPLE 3

Figure 8:
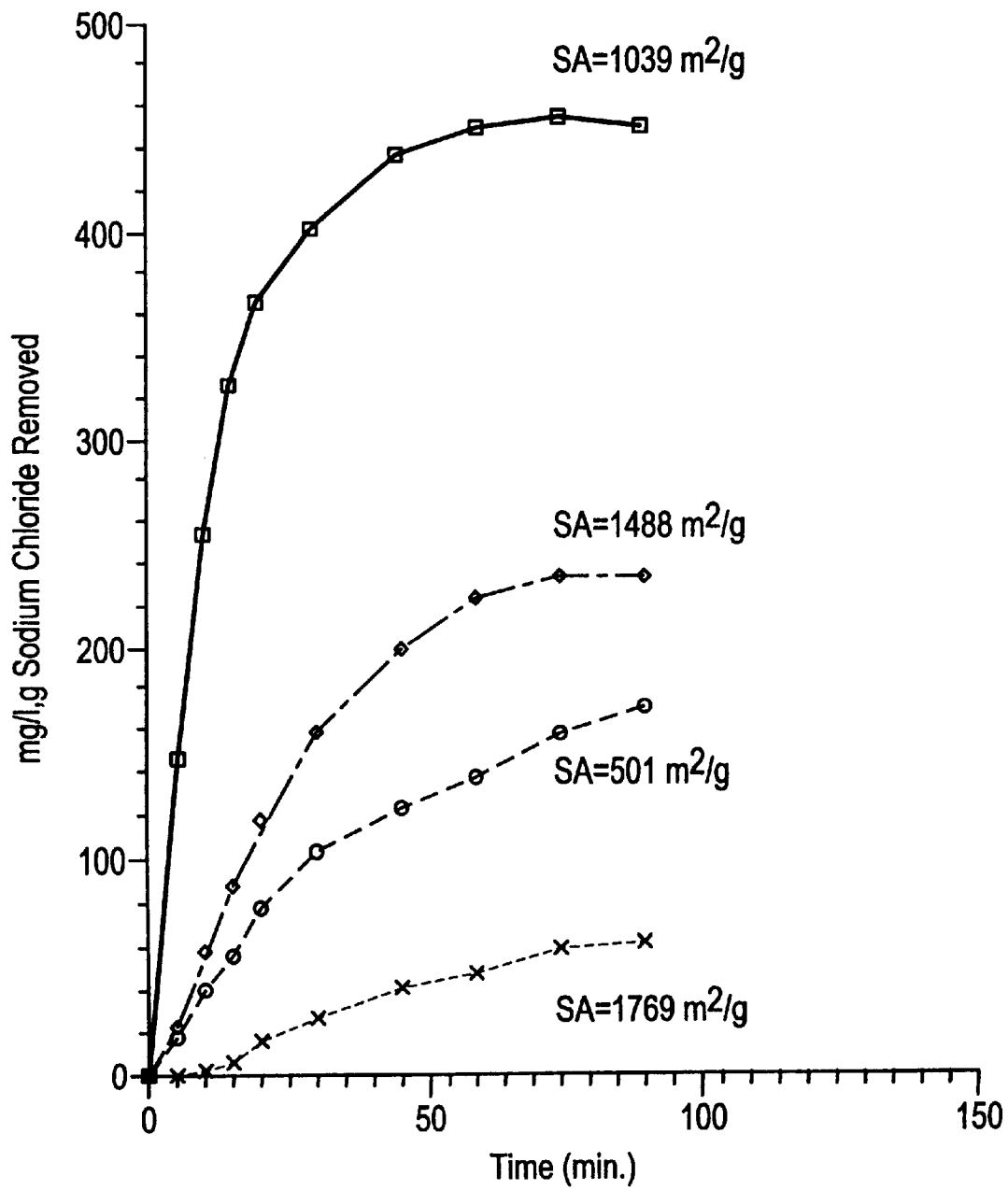
FIG. 8 is a plot of removal of sodium chloride versus time according to the present invention with electrodes of varying surface area.
Figure 9:
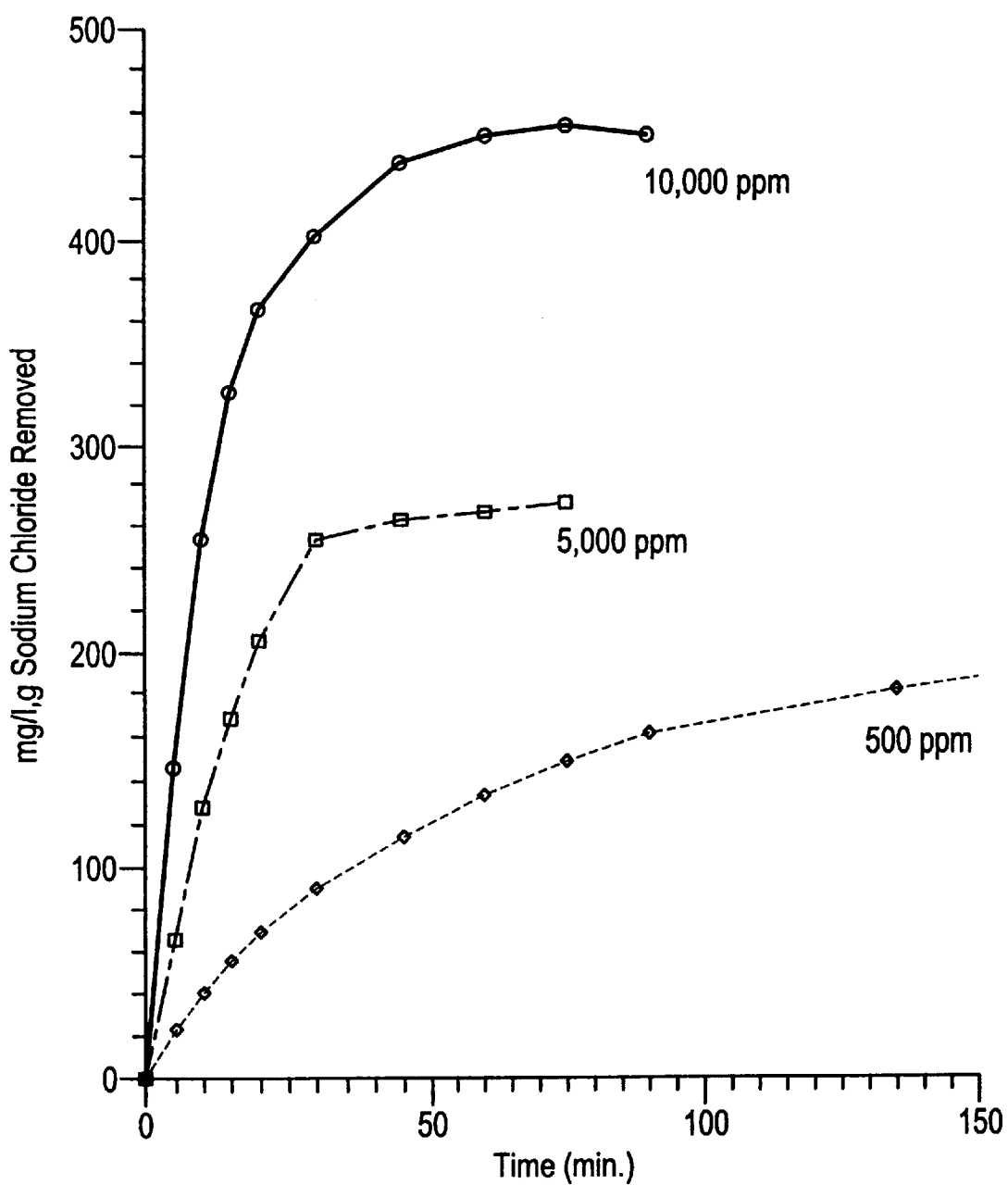
FIG. 9 is a plot of removal of sodium chloride versus time according to the present invention with salt solutions of varying starting concentrations.

To understand the effect of carbon structure on performance, electrodes were processed at various conditions of activation time and temperature, to obtain a range of surface areas from about 500 m$^2$/g to 1769 m$^2$/g based on the carbon weight. Sodium chloride solutions were then passed through these electrodes as described above. FIG. 8 shows data normalized to the amount of carbon in the electrodes. As the figure shows, the trends is for the removal rate and capacity to increase with an increase in surface area, up to a point, after which removal rate and capacity decrease. The Y axis for this figure is the amount of sodium chloride removed normalized to gram of carbon in the electrodes. The unexpected drop in performance with the higher surface area will be explained later. FIG. 9 shows the effect of salt concentration on the removal performance with the 1039 m$^2$ surface area electrodes for sodium chloride. These results are again normalized to unit weight of carbon in the electrode. As the data shows, the removal rate and capacity is a strong function of concentration. The rate increases from 3.2mg/l,g/min for 500 ppm to 10 mg/l,g/min for 5000 ppm and to 17.5 mg/l,g/min for 10,000 ppm concentration. The capacity also increases from 170 mg/g at 500 ppm to 260 mg/g at 5000 ppm and 450 mg/g at 10,000 ppm. All of these tests were carried out with the same electrode pair.

Figure 10:
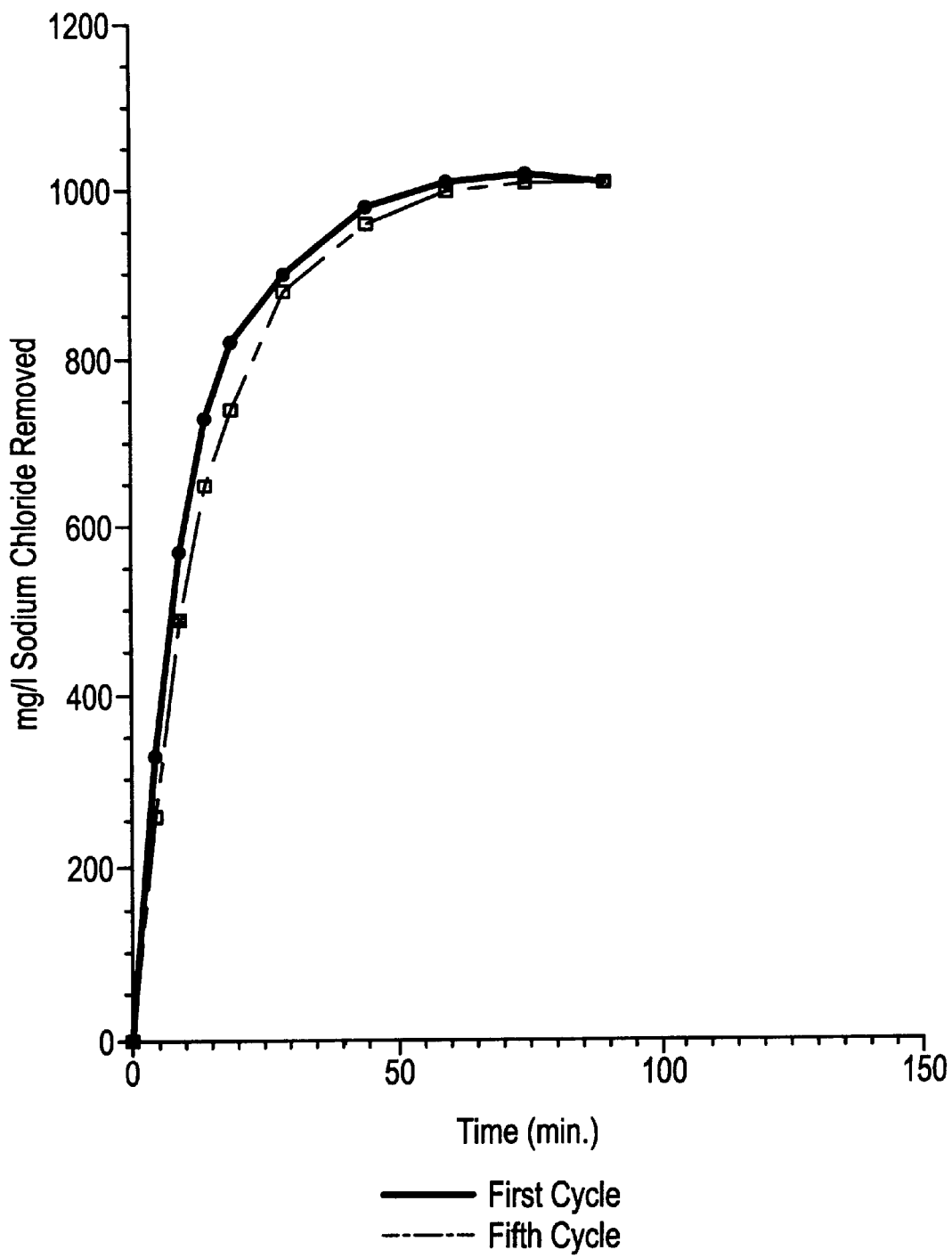
FIG. 10 is a plot of removal of sodium chloride versus time according to the present invention with repeated use of the electrodes.

Because many of these tests were repeated with the same electrode pair, which was washed to remove the ions after the particular experiment was complete, it was necessary to confirm that all the ions were indeed completely removed and the electrodes regained their original performance. Experiments were done with the same electrode pair repeatedly after washing for 5 cycles. In each case, the same removal capacity and efficiency was obtained. FIG. 10 shows the results obtained in the first and fifth cycle for comparison. As the figure shows, the performance is clearly reproduced as a result of the distilled water wash.

Figure 11:
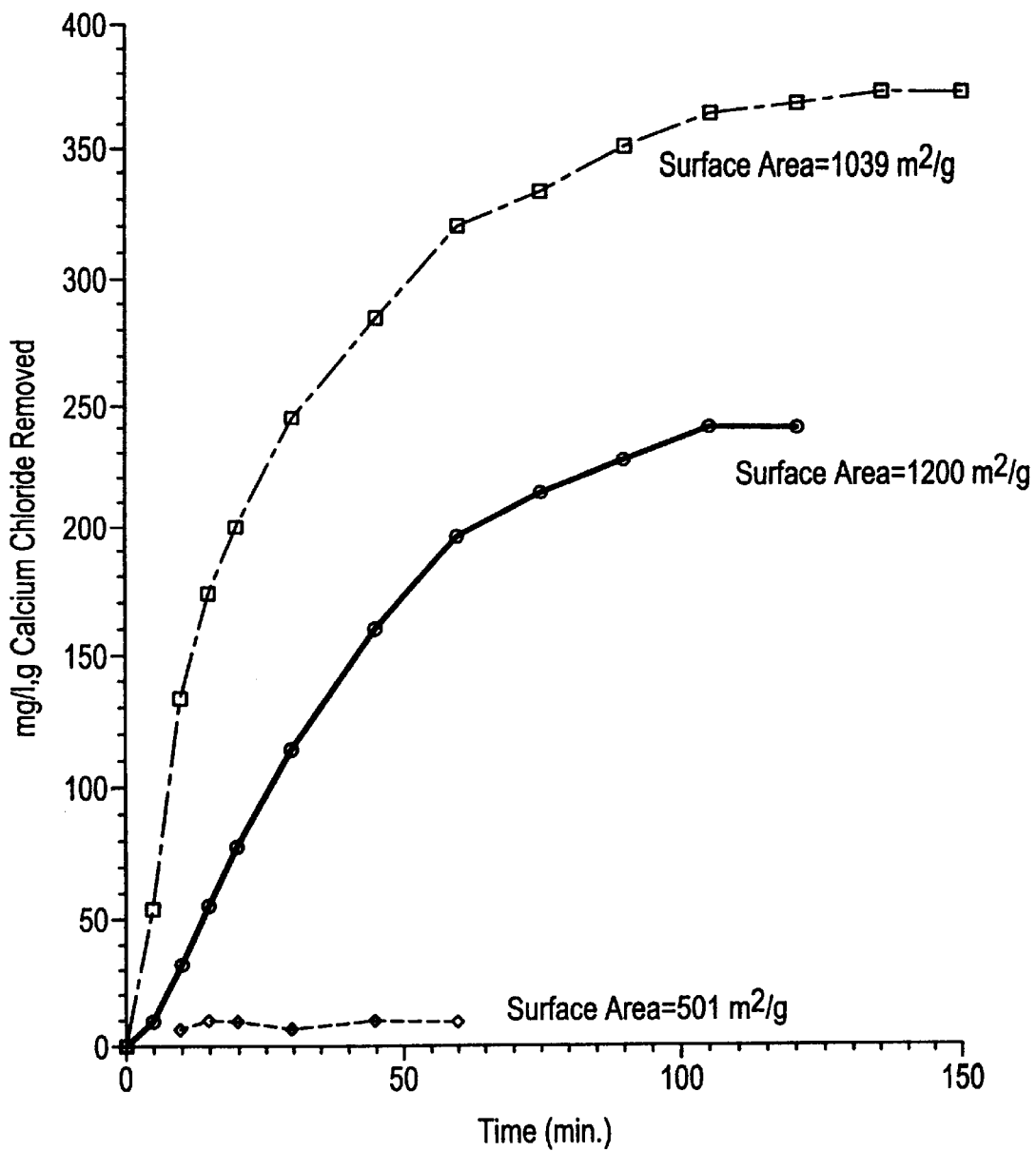
FIG. 11 is a plot of removal of calcium chloride versus time according to the present invention with electrodes of varying surface area.

Calcium chloride tests were done at the same concentration levels. The data is shown in FIG. 11 which shows data normalized to unit carbon weight in electrodes. The trend shown is identical to those seen in the case of sodium chloride. The data shows that the performance is optimum for 1039 m$^2$/g sample and that performance declines with increase in surface area to 1200 m$^2$/g.

Figure 12:
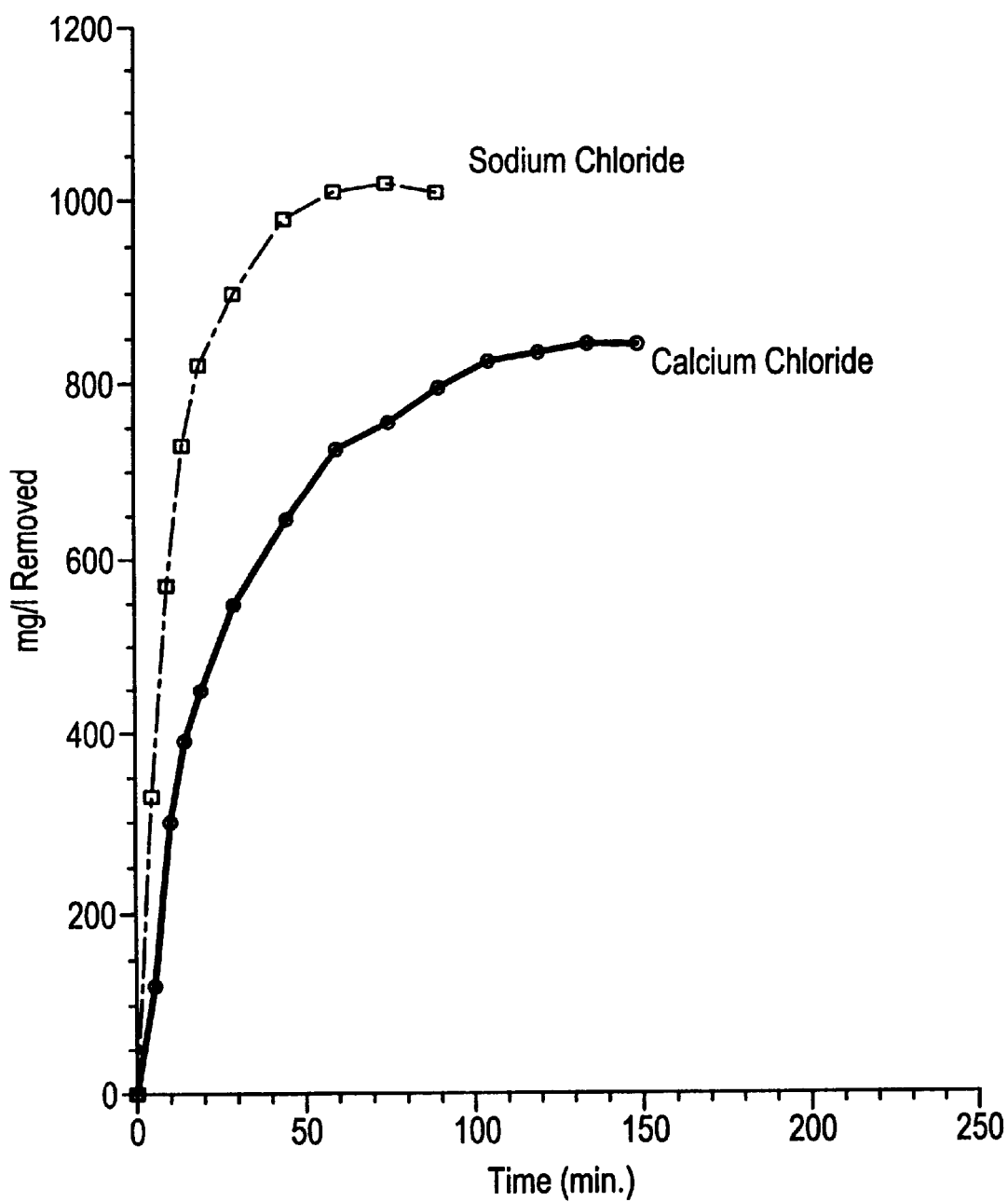
FIG. 12 is a plot showing a comparison of the removal of sodium and calcium chloride versus time according to the present invention.
Figure 13:
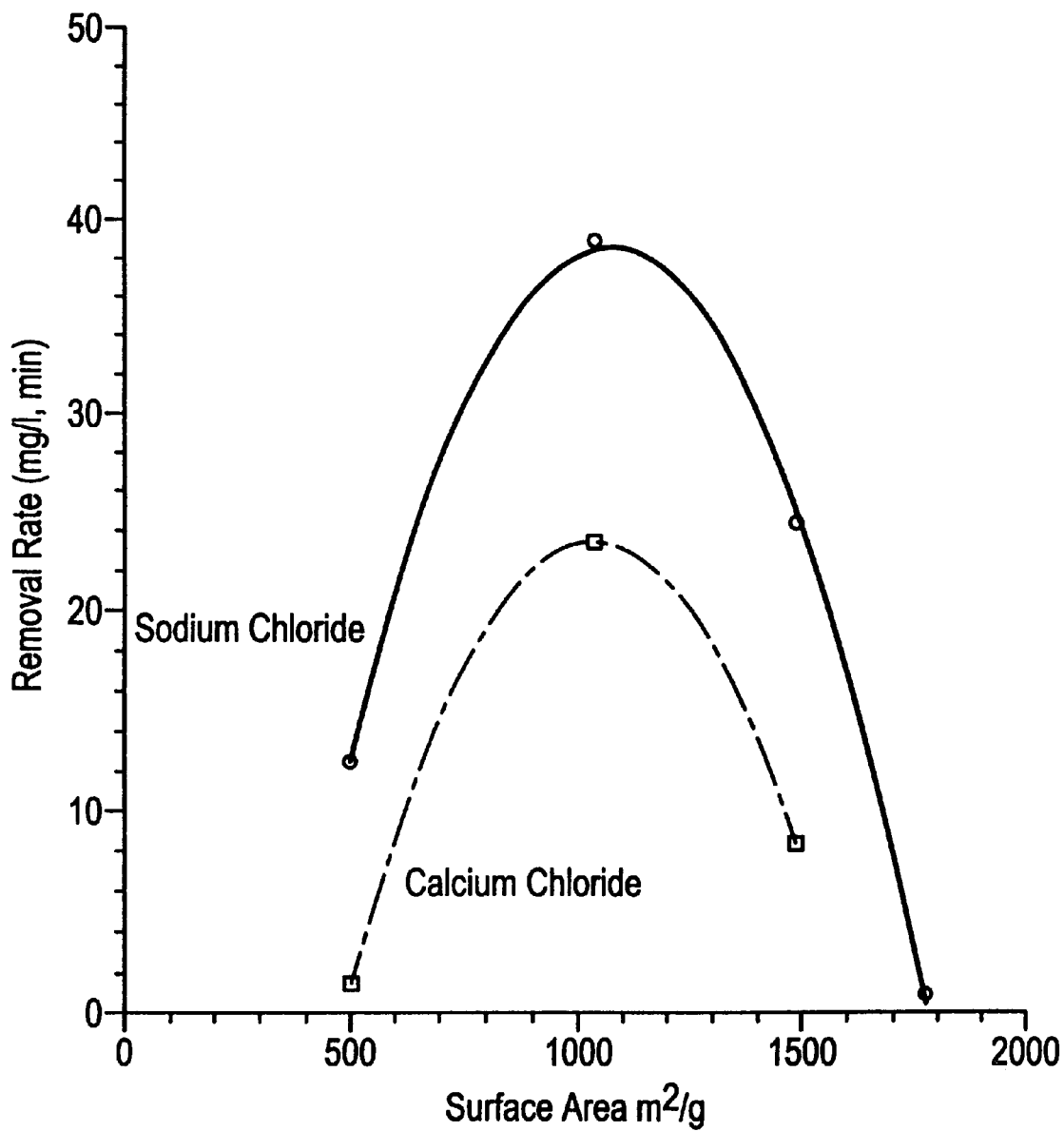
FIG. 13 is a plot showing a comparison of the removal of sodium and calcium chloride versus time according to the present invention with electrodes of varying surface area.

A comparison of the data for calcium and sodium chloride is shown in FIG. 12 for solution concentrations of 10,000 ppm. Ad the data shows, calcium chloride is removed at a slower rate and the removal capacity is lower. The trends are the same for solution concentrations of 5,000 ppm. FIG. 13 shows the comparison of removal rate for sodium and calcium as a function of surface area. Clearly, the removal rate for calcium chloride is lower than that for sodium chloride at all surface area levels. Another important point is that there is a clear maximum for removal rate for both the salts at about 1000 m$^2$/g surface area.

EXAMPLE 4

Figure 14:
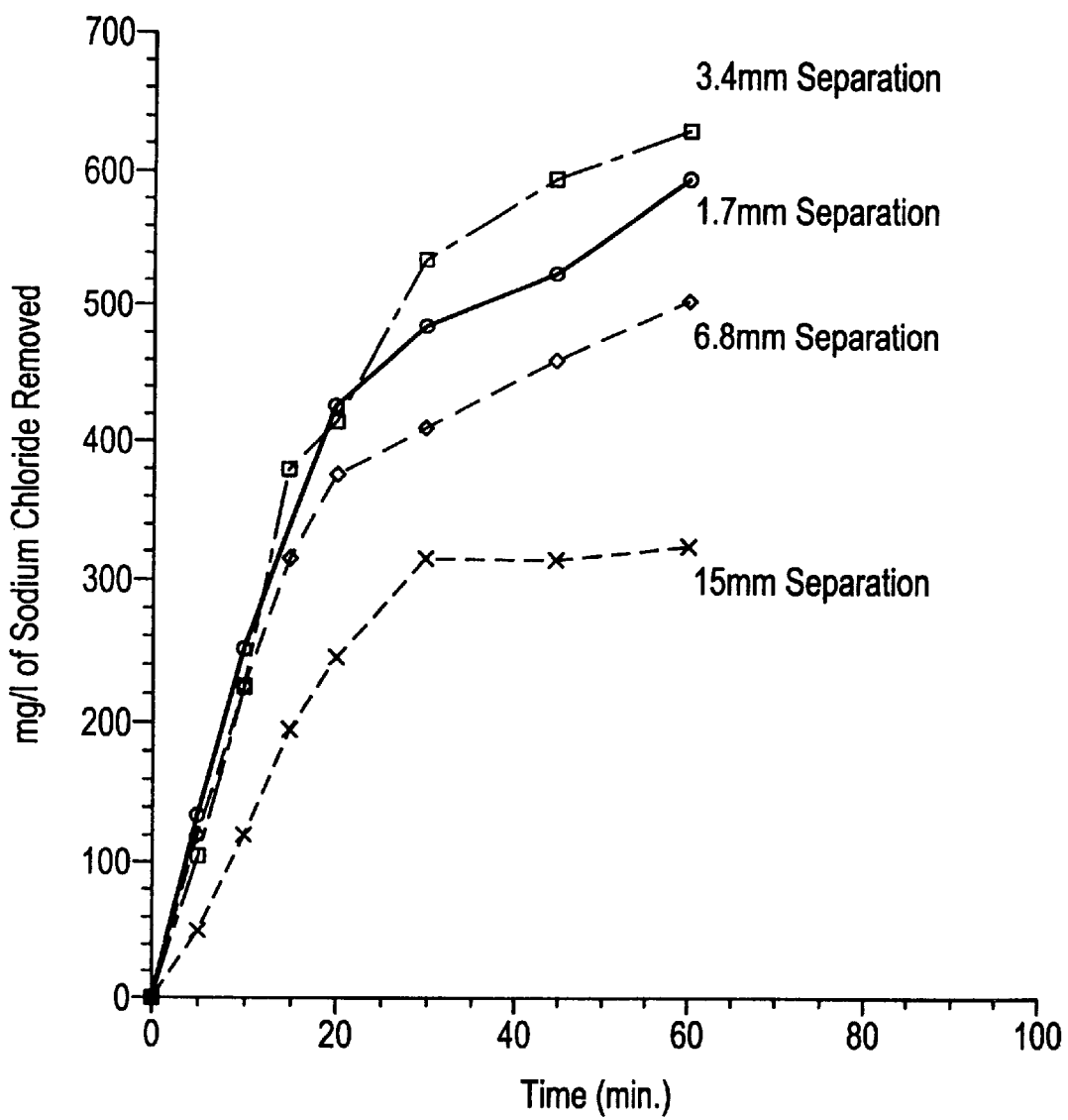
FIG. 14 is a plot of removal of sodium chloride versus time according to the present invention with varying distances between electrodes.

Tests were performed to evaluate some of the advantages of flow through honeycomb electrodes. FIG. 14 shows the data for a given electrode pair with the same potential difference across it, and under otherwise identical test conditions, except that the electrode separation distance was varied as shown. As the data shows, up to a separation distance of 3.4 mm (a relatively large distance) there is little or no difference in removal rate or capacity. At 6.8 mm separation, the initial removal rate remains the same, but the capacity declines slightly. At a very large distance of 15 mm, the performance drops significantly. Thus, electrode separation distances up to 4 mm can be used in construction of this device. The large distance between the electrodes allows considerable flexibility in constructing the device.

Figure 15:
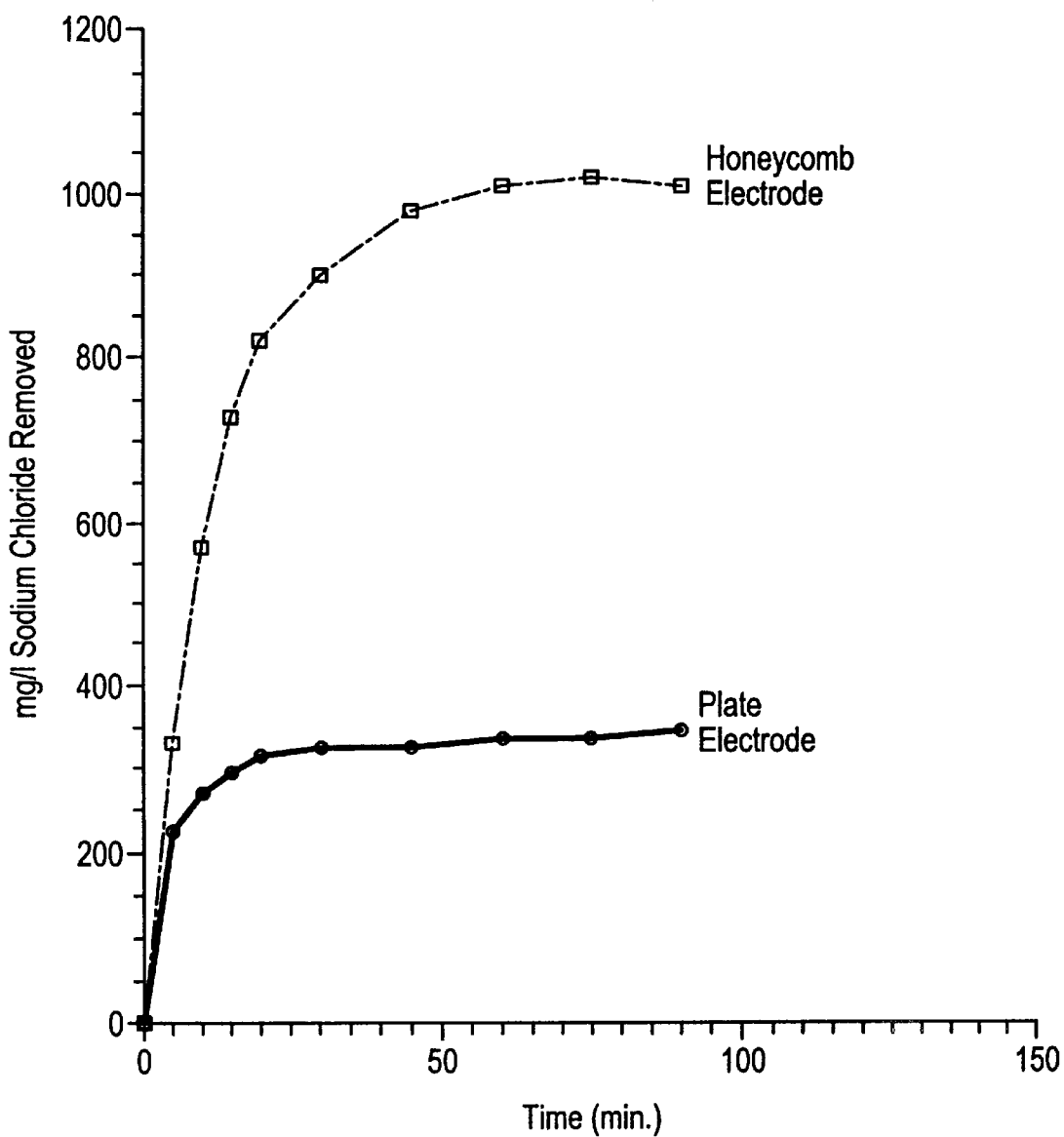
FIG. 15 is a plot of removal of sodium chloride versus time comparing flow through honeycomb electrodes of the present invention versus flow-around prior-art plate electrodes.

Another important point is illustrated in FIG. 15. This figure presents the comparison data for a flow-through honeycomb electrode and a plate electrode, where flow is standard-around the electrode. The electrodes were constructed in the same manner, were of the same composition, and the same carbon structure. Both types of electrode pairs contained the same amount of carbon. Tests were done under the same conditions of solution concentration, applied potential, etc. As the figure shows, the honeycomb electrode performance is substantially better than the plate electrodes because of the high surface area to volume ratio of the honeycombs. The total ion removal capacity is fourfold higher and the initial high removal rate is maintained for a much longer time of 20 minutes vs 5 minutes for the plate electrode.

EXAMPLE 5

Activated carbon electrode structures were fabricated as in Examples 1 and 2. Electrodes of about 50 mm in diameter and about 5 mm thick were drilled out of the square honeycomb structure. One face of the electrode was sputtered with titanium to result in a thickness of about 3 micrometers. A titanium wire of about 0.8 mm thickness was wrapped around the electrode to form the leads. Sixteen such electrodes were fabricated.

Figure 16:
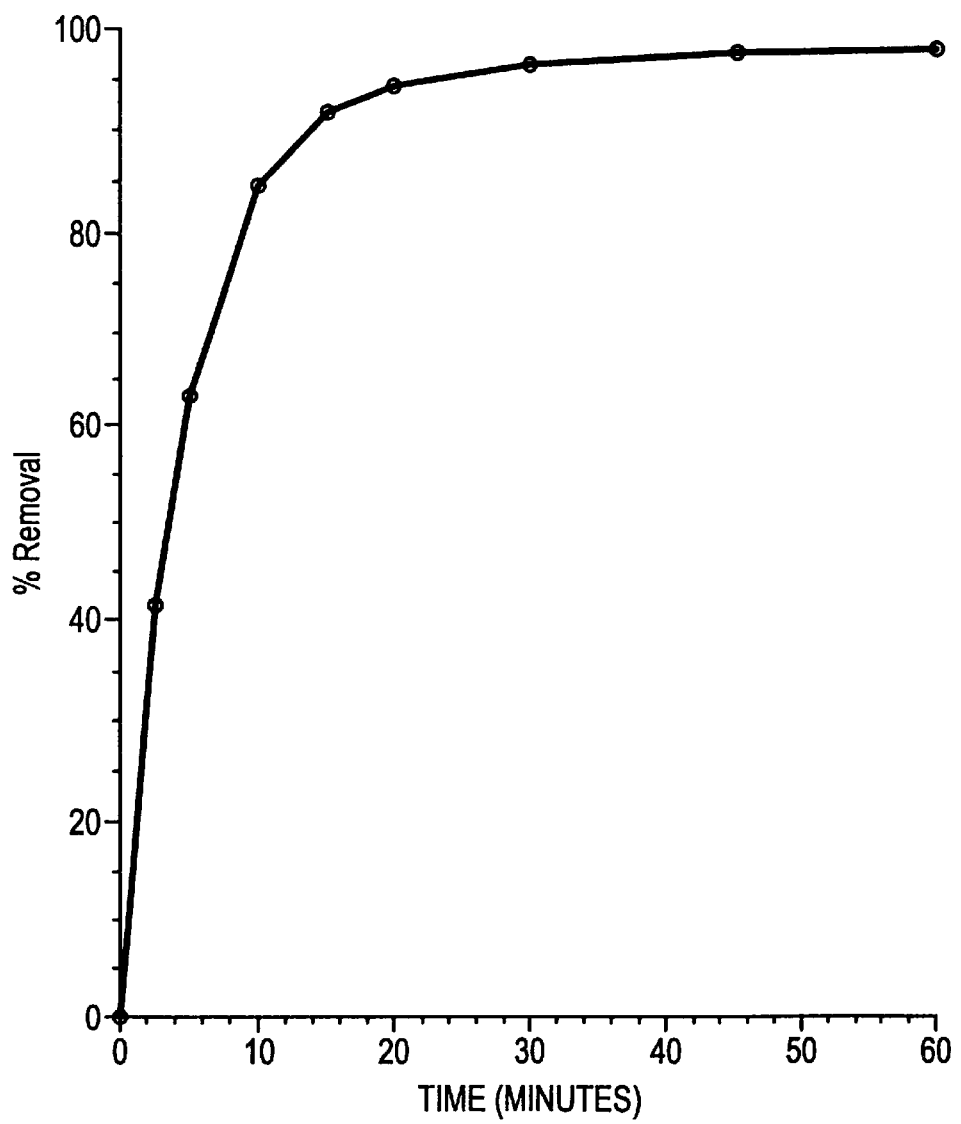
FIG. 16 is a plot of removal of calcium chloride versus time according to the present invention utilizing the system described in Example 5.

A structure was machined out of a polymethyl methacrylate block as shown in FIG. 6, which served as the housing for the electrodes. Bleed holes were put in the housing such that a bleed hole exits for each electrode pair. All sixteen electrodes were inserted into the housing. The housing was then closed and water was allowed to flow in. Air was bled out of the system through the bleed holes, which were then sealed. Once the system was sealed, the electrodes were alternately attached to the positive and negative terminals of a power source at 2V. A peristaltic pump was used to pump 300 ml of a 500 ppm $CaCl_2$ solution through this system. Within about 20 minutes, about 95% of the $CaCl_2$ is removed with close to 100% removal in about one hour, as shown in FIG. 16.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. An electrode for deionization of water comprising:
   a) a continuous activated carbon structure, wherein the activated carbon is derived from a synthetic carbon precursor, the structure having openings disposed therein, and an inlet end and an outlet end, such that water entering the inlet end, passes through the openings, and exits through the outlet end, wherein the structure has an outer surface;
   b) a conductive coating on at least part of the outer surface of the structure; and
   c) a metal wire in contact with the structure.

2. An electrode of claim 1 wherein the openings throughout the structure are in the form of pores.

3. An electrode of claim 2 wherein the average pore diameter is at least about 0.5 micrometers.

4. An electrode of claim 1 wherein the surface area of the activated carbon is from about 100 $m^2/g$ to 1600 $m^2/g$.

5. An electrode of claim 1 wherein the openings throughout the continuous activated carbon structure are in the form of through-channels extending the length of the structure from inlet end to outlet end.

6. An electrode of claim 1 wherein the structure is a honeycomb having a plurality of channels defined by porous walls, extending essentially parallel to the length of the structure, from inlet end to outlet end.

7. An electrode of claim 6 wherein a portion of the honeycomb channels are plugged at the inlet surface, and the remaining portion of honeycomb channels are plugged at the outlet end, whereby a stream of water entering the structure through the open cells at the inlet end, passes through the porous walls, and exits the structure through the open cells at the outlet end.

8. An electrode of claim 1 wherein the thickness of the conductive coating is no greater than about 2% of the thickness of the structure.

9. An electrode of claim 8 wherein the thickness of the conductive coating is no greater than about 0.1% of the thickness of the structure.

10. An electrode of claim 9 wherein the thickness of the conductive coating is no greater than about 0.04% of the thickness of the structure.

11. An electrode of claim 1 wherein the conductive coating is of titanium metal.

12. A system for electrolytic removal of ions from water, the system comprising:
   a) a plurality of electrodes, each electrode comprising
      i) a continuous activated carbon structure, wherein the activated carbon is derived from a synthetic carbon precursor, the structure having openings disposed therein, and an inlet end and an outlet end, such that water entering the inlet end, passes through the openings, and exits through the outlet end, wherein the structure has an outer surface,
      ii) a conductive coating on at least part of the outer surface of the structure, and
      iii) a metal wire in contact with the structure,
      the electrodes positioned in series so that the outlet end of one electrode is next to the inlet end of the nearest downstream electrode, so that a stream of water passes into the inlet end of each electrode in series, and exits at the outlet end, and enters the inlet end of the next downstream electrode, until it exits the device at the outlet end of the most downstream electrode, the metal wire of each electrode being connected to a power source to deliver the opposite charge as the charge delivered to its neighboring electrodes, such that one electrode is a positive electrode and its neighbors are negative electrodes,
      whereby as an ion-containing stream of water passes through the system, positive ions are attracted to the negative electrode, and negative ions are attracted to the positive electrode, and a water stream having its ion content reduced is obtained, and exits at the outlet end of the most downstream electrode;
   b) a housing for holding said plurality of electrodes, to which housing each of the electrodes is fixedly attached and sealed within, with an air and moisture-tight seal; and
   c) housing openings disposed in the housing between the electrodes, through which air is removed after which the openings are sealed, before a water stream is passed through the system.

13. A system of claim 12 wherein in each electrode, the openings throughout the structure are in the form of pores.

14. A system of claim 12 wherein in each electrode, the average pore diameter is at least about 0.5 micrometers.

15. A system of claim 12 wherein the surface area of the activated carbon is from about 100 $m^2/g$ to 1600 $m^2/g$.

16. A system of claim 12 wherein in each electrode, the openings throughout the structure are in the form of through-channels extending the length of the electrode from inlet end to outlet end.

17. A system of claim 12 wherein in each electrode, the structure is a honeycomb having a plurality of channels defined by porous walls, extending essentially parallel to each other along the length of the structure, from inlet end to outlet end.

18. A system of claim 17 wherein in each electrode, a portion of the honeycomb channels are plugged at the inlet end, and the remaining portion of honeycomb channels are plugged at the outlet end, whereby a stream of water enters the structure through the open cells at the inlet end, passes through the porous walls, and exits the structure through the open cells at the outlet end.

19. A system of claim 12 wherein in each electrode, the thickness of the conductive coating is no greater than about 2% of the thickness of the electrode structure.

20. A system of claim 19 wherein the thickness of the conductive coating is no greater than about 0.1% of the thickness of the electrode structure.

21. A system of claim 20 wherein the thickness of the conductive coating is no greater than about 0.04% of the thickness of the electrode structure.

22. A system of claim 12 wherein the conductive coating is of titanium metal.

* * * * *